May 18, 1926.
P. E. COURSEN ET AL
1,585,533
COMBINATION KNIFE AND FORK
Filed Dec. 10, 1925
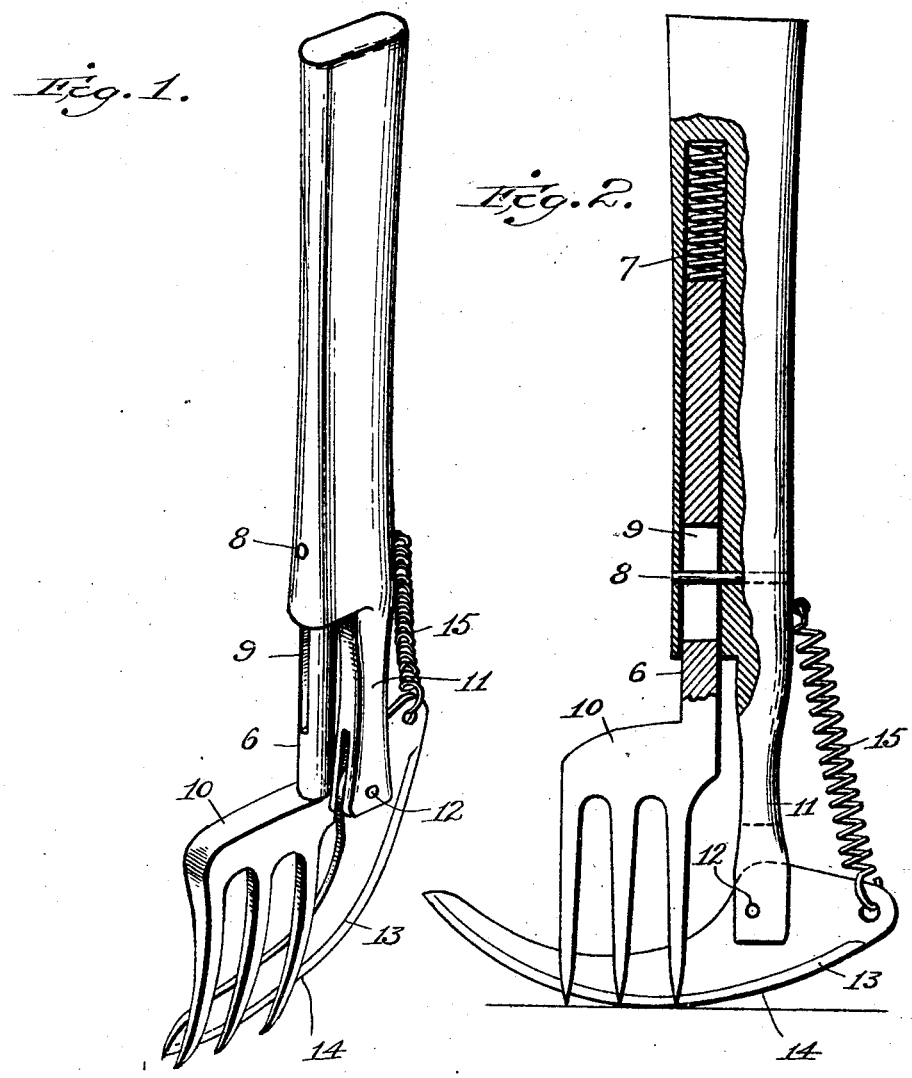
Inventors
Phoeb E. Coursen
Ernest F. Jacobus
By Davis & Davis
Attorneys Patented May 18, 1926.

1,585,533

UNITED STATES PATENT OFFICE.

PHOEBE E. COURSEN, OF NEW YORK, N. Y., AND ERNEST F. JACOBUS, OF POND EDDY, PENNSYLVANIA.

COMBINATION KNIFE AND FORK.

Application filed December 10, 1925. Serial No. 74,515.

The object of this invention is to provide a simple eating tool for use by one-handed persons or persons with one hand incapacitated, as more fully hereinafter set forth.

In the drawing annexed—

Fig. 1 is a perspective view showing the parts in repose;

Fig. 2 is a view partly in side elevation and partly in section showing the parts in action.

In the drawings, 5 designates the handle, which is provided with a longitudinal passage in which slides the cylindrical shank 7 of the fork, a coil-spring 7 being housed in said passage in position to normally project the fork downwardly. The shank is prevented from being ejected from the passage by means of a pin 8 extending through the handle transversely and through a slot 8 in the shank. The shank rises from one end of the top-bar 10 of the tines, so that the set of tines is somewhat offset from the handle.

Depending from the lower end of the handle in parallelism with the shank 6 is a rigid finger 11. The lower slotted end of this finger 11 is pivoted at 12 to the knife 13, whose curved cutting-edge 14 extends across the set of tines in a plane substantially parallel with the tines, so that said cutting-edge will operate close to the impaling ends of the tines. Attached to the rear end of the blade 13 is a coil retractile spring 15 whose upper end is attached to the handle, thereby tending to swing the cutting-end of the blade downwardly.

In use, when the fork is thrust downwardly into an article of food, the same action brings the cutting edge of the blade down on the piece of food alongside the tines. As the handle is pressed downwardly, the fork recedes and the cutting-edge 14 is pushed across the article of food with a draw-cut, the pressure that the user puts on the handle serving to force the knife-edge into the article of food. It will be observed that a feature of importance lies in locating the pivot 12 at a point to one side of the tines and in so curving the knife that the edge thereof will, by simply pressing down quickly on the handle, perform the cutting operation with a draw, thus materially facilitating the cutting of the article of food, especially meat.

What we claim as new is:

A combination knife and fork embodying a handle, a set of fork tines having an offset shank slidably working in a longitudinal passage in the handle, a spring enclosed in the handle for normally projecting the fork, a stop device for arresting the fork, a depending finger affixed to the handle alongside the fork shank and on the opposite side of the offset, a curved knife pivoted on the lower end of this finger and having a curved cutting-edge extending across the fork tines, and a spring for normally forcing the cutting-edge of the knife downwardly.

In testimony whereof we have hereunto affixed our signatures.

PHOEBE E. COURSEN.
ERNEST F. JACOBUS.